US011751275B2

(12) United States Patent
Gopal et al.

(10) Patent No.: US 11,751,275 B2
(45) Date of Patent: Sep. 5, 2023

(54) MANAGEMENT OF ANTENNA SWITCHING ACCORDING TO A SOUNDING REFERENCE SYMBOL ANTENNA SWITCHING CONFIGURATION

(71) Applicant: QUALCOMM Incorporated, San Diego, CA (US)

(72) Inventors: Thawatt Gopal, San Diego, CA (US); Brian Clarke Banister, San Diego, CA (US); Timothy Paul Pals, San Diego, CA (US); Reza Shahidi, San Diego, CA (US); Supratik Bhattacharjee, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 116 days.

(21) Appl. No.: 17/249,063

(22) Filed: Feb. 18, 2021

(65) Prior Publication Data

US 2021/0267005 A1     Aug. 26, 2021

Related U.S. Application Data

(60) Provisional application No. 62/979,263, filed on Feb. 20, 2020.

(51) Int. Cl.
*H04W 76/25*     (2018.01)
*H04W 88/06*     (2009.01)

(52) U.S. Cl.
CPC ............ *H04W 76/25* (2018.02); *H04W 88/06* (2013.01)

(58) Field of Classification Search
CPC ..... H04W 76/25; H04W 88/06; H04W 76/16; H04B 7/0814; H04B 7/0802; H04B 7/0608; H04B 7/0602
See application file for complete search history.

(56) References Cited

U.S. PATENT DOCUMENTS

| 9,271,278 B2 * | 2/2016 | Heo ...................... H04W 72/12 |
| 2013/0310045 A1 * | 11/2013 | Yan ...................... H04B 7/0602 455/437 |

(Continued)

FOREIGN PATENT DOCUMENTS

WO     2020028366     2/2020

OTHER PUBLICATIONS

International Search Report and Written Opinion—PCT/US2021/070165—ISA/EPO—May 25, 2021.

*Primary Examiner* — Kodzovi Acolatse
*Assistant Examiner* — Anindita Sen
(74) *Attorney, Agent, or Firm* — Harrity & Harrity, LLP

(57) ABSTRACT

Various aspects of the present disclosure generally relate to wireless communication. In some aspects, a user equipment (UE) may receive an antenna switch selection associated with a dual connectivity antenna configuration, wherein the antenna switch selection is associated with a first radio access technology (RAT) and the dual connectivity antenna configuration permits communication via the first RAT and a second RAT; determine, based at least in part on the antenna switching selection, a quantity of communication chains, associated with the first RAT, that are affected by an antenna switching process of the second RAT; and selectively permit, based at least in part on the quantity of communication chains, a reconfiguration of the dual connectivity antenna configuration according to the antenna switch selection. Numerous other aspects are provided.

28 Claims, 11 Drawing Sheets

(56) References Cited

U.S. PATENT DOCUMENTS

| | | | |
|---|---|---|---|
| 2018/0227960 A1* | 8/2018 | Belghoul | H04L 1/1854 |
| 2019/0052328 A1* | 2/2019 | Akula | H04L 5/006 |
| 2020/0045760 A1* | 2/2020 | Adjakple | H04W 76/15 |
| 2020/0154496 A1* | 5/2020 | Yi | H04W 72/56 |
| 2021/0135816 A1* | 5/2021 | Davydov | H04L 5/0091 |

* cited by examiner

MANAGEMENT OF ANTENNA SWITCHING ACCORDING TO A SOUNDING REFERENCE SYMBOL ANTENNA SWITCHING CONFIGURATION

CROSS-REFERENCE TO RELATED APPLICATION

This patent application claims priority to U.S. Provisional Patent Application No. 62/979,263, filed on Feb. 20, 2020, entitled "MANAGEMENT OF ANTENNA SWITCHING ACCORDING TO A SOUNDING REFERENCE SYMBOL ANTENNA SWITCHING CONFIGURATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for management of antenna switching according to a sounding reference symbol (SRS) antenna switching configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include identifying an antenna switch selection associated with a dual connectivity antenna configuration, wherein the antenna switch selection is associated with a first radio access technology (RAT) and the dual connectivity antenna configuration permits communication via the first RAT and a second RAT; determining, based at least in part on the antenna switch selection, a quantity of communication chains, associated with the first RAT, that are affected by an antenna switching process of the second RAT; and selectively permitting, based at least in part on the quantity of communication chains, a reconfiguration of the dual connectivity antenna configuration according to the antenna switch selection.

In some aspects, a method of wireless communication, performed by a UE, may include determining that an antenna configuration, relative to a plurality of possible antenna configurations, causes a highest quantity of communication disruptions of a first RAT during an antenna switching process of a second RAT; and preventing the antenna configuration from being selected in association with an antenna switching request associated with the first RAT.

In some aspects, a UE for wireless communication may include a memory and one or more processors operatively coupled to the memory. The memory and the one or more processors may be configured to identify an antenna switch selection associated with a dual connectivity antenna configuration, wherein the antenna switch selection is associated with a first RAT and the dual connectivity antenna configuration permits communication via the first RAT and a second RAT; determine, based at least in part on the antenna switch selection, a quantity of communication chains, associated with the first RAT, that are affected by an antenna switching process of the second RAT; and selectively permit, based at least in part on the quantity of communication chains, a reconfiguration of the dual connectivity antenna configuration according to the antenna switch selection.

In some aspects, a UE for wireless communication may include a memory and one or more processors operatively coupled to the memory. The memory and the one or more processors may be configured to determine that an antenna configuration, relative to a plurality of possible antenna configurations, causes a highest quantity of communication disruptions of a first RAT during an antenna switching process of a second RAT; and prevent the antenna configuration from being selected in association with an antenna switching request associated with the first RAT.

In some aspects, a non-transitory computer-readable medium may store one or more instructions for wireless communication. The one or more instructions, when executed by one or more processors of a UE, may cause the one or more processors to identify an antenna switch selection associated with a dual connectivity antenna configuration, wherein the antenna switch selection is associated with a first RAT and the dual connectivity antenna configuration permits communication via the first RAT and a second RAT; determine, based at least in part on the antenna switch selection, a quantity of communication chains, associated with the first RAT, that are affected by an antenna switching process of the second RAT; and selectively permit, based at least in part on the quantity of communication chains, a reconfiguration of the dual connectivity antenna configuration according to the antenna switch selection.

In some aspects, a non-transitory computer-readable medium may store one or more instructions for wireless communication. The one or more instructions, when executed by one or more processors of a UE, may cause the one or more processors to determine that an antenna configuration, relative to a plurality of possible antenna configurations, causes a highest quantity of communication disruptions of a first RAT during an antenna switching process of a second RAT; and prevent the antenna configuration from being selected in association with an antenna switching request associated with the first RAT.

In some aspects, an apparatus for wireless communication may include means for identifying an antenna switch selection associated with a dual connectivity antenna configuration, wherein the antenna switch selection is associated with a first RAT and the dual connectivity antenna configuration permits communication via the first RAT and a second RAT; means for determining, based at least in part on the antenna switch selection, a quantity of communication chains, associated with the first RAT, that are affected by an antenna switching process of the second RAT; and means for selectively permitting, based at least in part on the quantity of communication chains, a reconfiguration of the dual connectivity antenna configuration according to the antenna switch selection.

In some aspects, an apparatus for wireless communication may include means for determining that an antenna configuration, relative to a plurality of possible antenna configurations, causes a highest quantity of communication disruptions of a first RAT during an antenna switching process of a second RAT; and means for preventing the antenna configuration from being selected in association with an antenna switching request associated with the first RAT.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
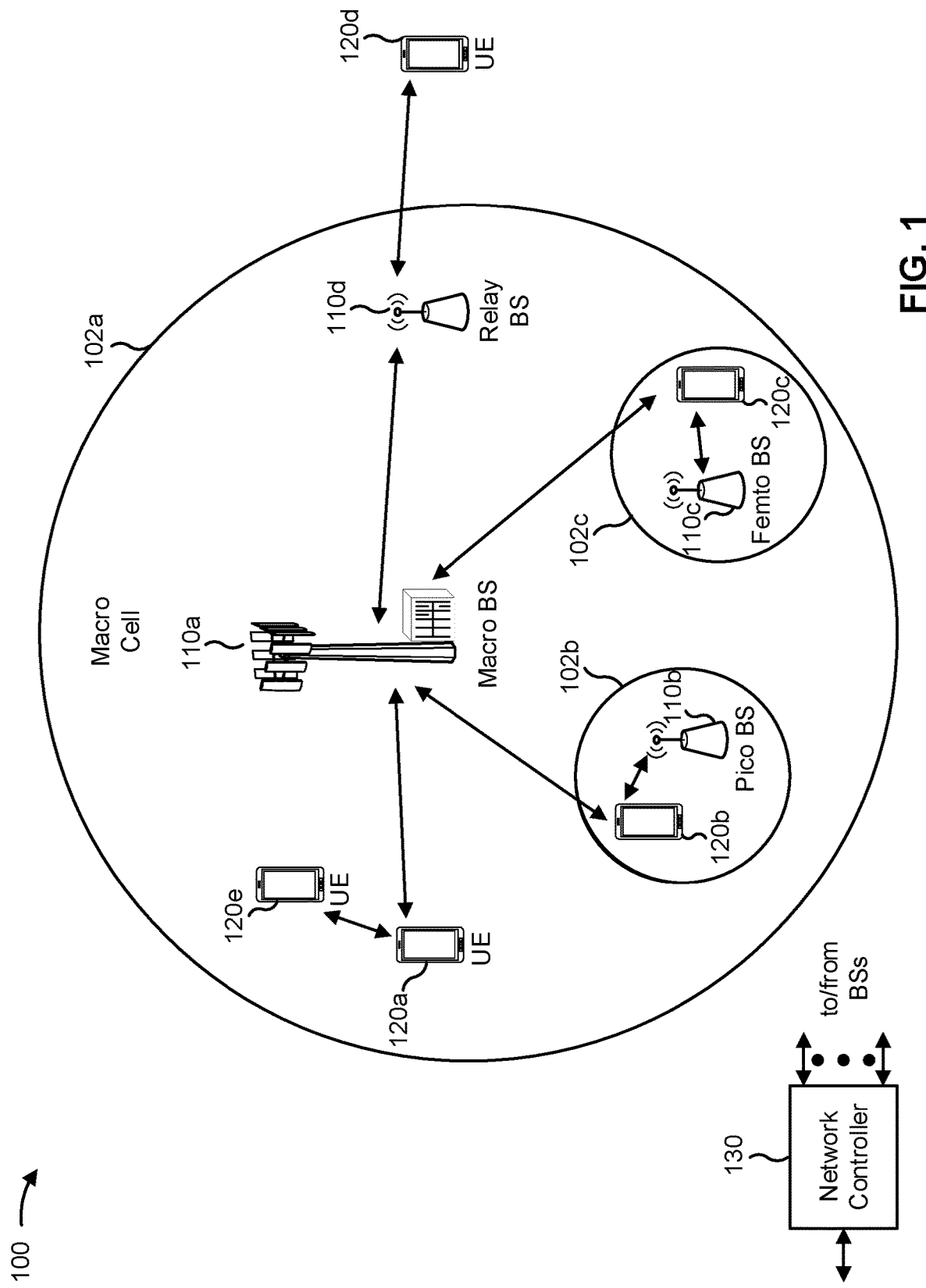
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V21) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
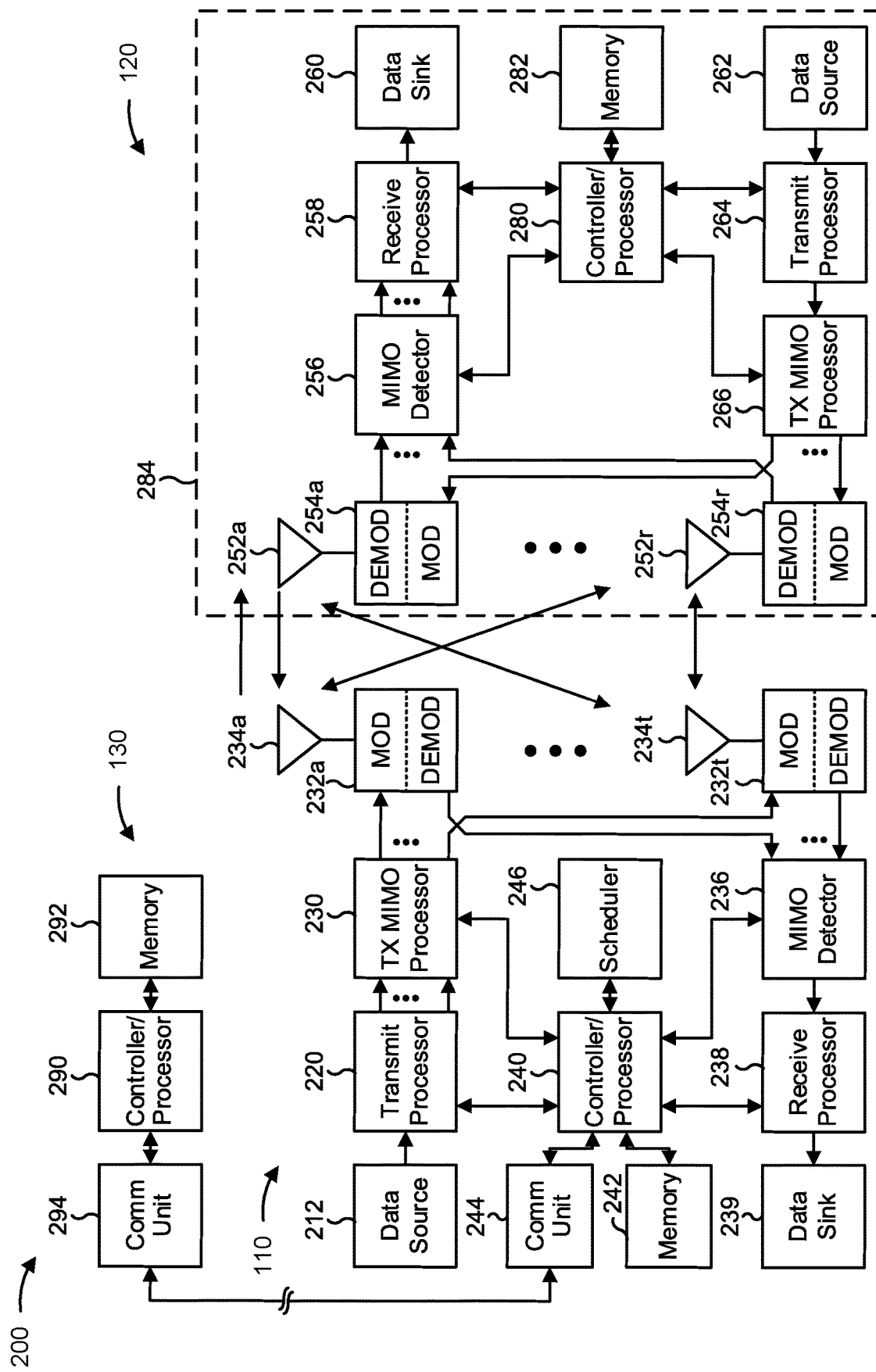
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-10.

Controller/processor 240 of base station 110, controller/processor 280 of UE 120, and/or any other component(s) of FIG. 2 may perform one or more techniques associated with management of antenna switching according to a sounding reference symbol (SRS) antenna switching configuration, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 may include means for identifying an antenna switch selection associated with a dual connectivity antenna configuration, wherein the antenna switch selection is associated with a first RAT and the dual connectivity antenna configuration permits communication via the first RAT and a second RAT; means for determining, based at least in part on the antenna switch selection, a quantity of communication chains, associated with the first RAT, that are affected by an antenna switching process of the second RAT; and/or means for selectively permitting, based at least in part on the quantity of communication chains, a reconfiguration of the dual connectivity antenna configuration according to the antenna switch selection. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, or the like.

In some aspects, UE 120 may include means for determining that an antenna configuration, relative to a plurality of possible antenna configurations, causes a highest quantity of communication disruptions of a first RAT during an antenna switching process of a second RAT; and/or means for preventing the antenna configuration from being selected in association with an antenna switching request associated with the first RAT. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
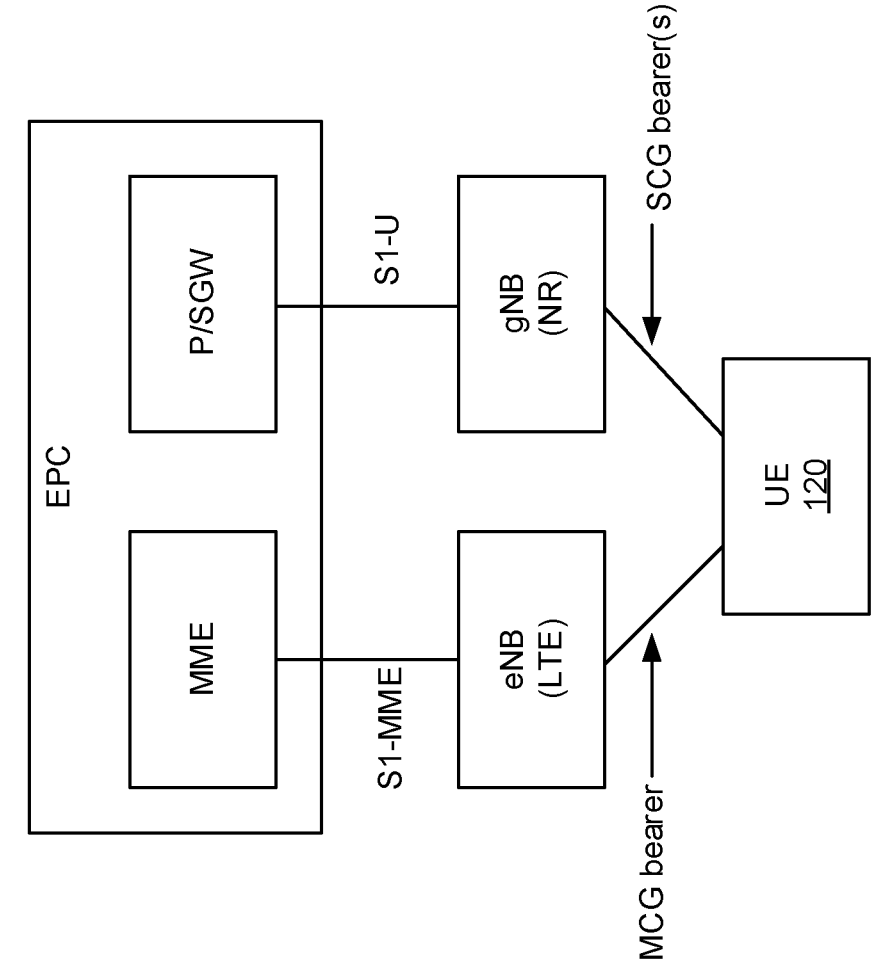
FIG. 3 is a diagram illustrating an example of dual connectivity, in accordance with the present disclosure.

FIG. 3 is a diagram illustrating an example 300 of dual connectivity, in accordance with the present disclosure. The example shown in FIG. 3 is for an Evolved Universal Mobile Telecommunications System Terrestrial Radio Access (E-UTRA)-NR dual connectivity (ENDC) mode. In the ENDC mode, a UE 120 communicates using an LTE RAT on a master cell group (MCG), and the UE 120 communicates using an NR RAT on a secondary cell group (SCG). However, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). The ENDC mode is sometimes referred to as an NR or 5G non-standalone (NSA) mode. Thus, as used herein, "dual connectivity mode" may refer to an ENDC mode, an NEDC mode, an NRDC mode, and/or another type of dual connectivity mode.

As shown in FIG. 3, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 3, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 3, in some aspects, a wireless network that permits operation in a 5G NSA mode may permit such operations using a master cell group (MCG) for a first RAT (e.g., an LTE RAT or a 4G RAT) and a secondary cell group (SCG) for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

As indicated above, FIG. 3 is provided as an example. Other examples may differ from what is described with respect to FIG. 3.

In some instances, a UE may include an antenna configuration (e.g., a MIMO configuration) that enables dual connectivity via multiple, different RATs, referred to herein as a dual connectivity antenna configuration. For example, the antenna configuration may enable LTE communications and NR communications of the UE to share a same set of antennas and/or cross-switches (and/or other hardware components of the UE). The individual RATs may perform various operations and/or processes that involve switching a configuration of the dual connectivity antenna configuration such that communication chains of the RATs are altered (e.g., via an adjustment to the cross-switches) to transmit or receive communications via different antennas of the antenna configuration. For example, an LTE process can involve detecting an antenna of the dual connectivity antenna configuration that is more suited for UL communication, and request (e.g., via an antenna switching diversity (Asdiv) selection and/or process) or initiate a reconfiguration of the dual connectivity antenna configuration. As another example, an NR process can involve an SRS antenna switching process that involves transmitting an SRS via a different transmit antenna of the dual connectivity antenna configuration to test the channel quality of that antenna. Such operations and/or processes cause outages (e.g., disruptions or interruptions) of communication chains (e.g., transmit (Tx) chains and/or receive (Rx) chains) of one or both of the RATs, depending on the switching that is performed, due to the physical configuration of the hardware being changed. The outages of the communication chains can result in dropped traffic data, and correspondingly, wasted resources associated with sending, receiving, and/or processing communications associated with the dropped traffic data. Furthermore, relatively more frequent outages can cause radio link failure for one of the RATs (e.g., LTE in the above example) due to frequent disruptions to Tx chains and/or Rx chains of the RAT.

Some aspects described herein manage antenna switching for a dual connectivity antenna configuration based at least in part on an analysis of an impact of SRS antenna switching according to the antenna switching configuration. For example, a controller of the UE (e.g., controller/processor 280) may determine whether performing antenna switching according to an Asdiv Tx antenna selection is to be performed based at least in part on a quantity of communication chains that would be affected (e.g., would experience a disruption) by an SRS antenna switching process that utilizes that Asdiv Tx antenna selection. In this way, if the quantity satisfies a threshold quantity of allowable communication chains that can be interrupted (e.g., which can be configured or established according to the dual connectivity antenna configuration, according to a downlink rank state of the UE, and/or the like), the controller may permit the antenna switching to be performed. On the other hand, if the quantity does not satisfy the threshold, the antenna switching can be blocked to prevent the outages (e.g., or an increase in outages) from occurring during an SRS antenna switching process under the Asdiv Tx antenna selection.

In some aspects, the set or defined threshold quantity of allowable communication chains that can be interrupted may impact a maximum downlink rank state associated with the UE (and/or be based on the maximum downlink rank). For example, the sum of the threshold and the maximum downlink rank state may be based on the total quantity of antennas (e.g., of a MIMO antenna configuration) of the dual connectivity antenna configuration, a cross-switch configuration of the dual connectivity antenna configuration, and/or the like.

In this way, based at least in part on an analysis of an SRS antenna switching process under certain configurations of a dual connectivity antenna configuration, the controller can conserve computing resources, communication resources (e.g., of a physical uplink shared channel) and/or network resources, according to various aspects of this disclosure.

Figure 4:
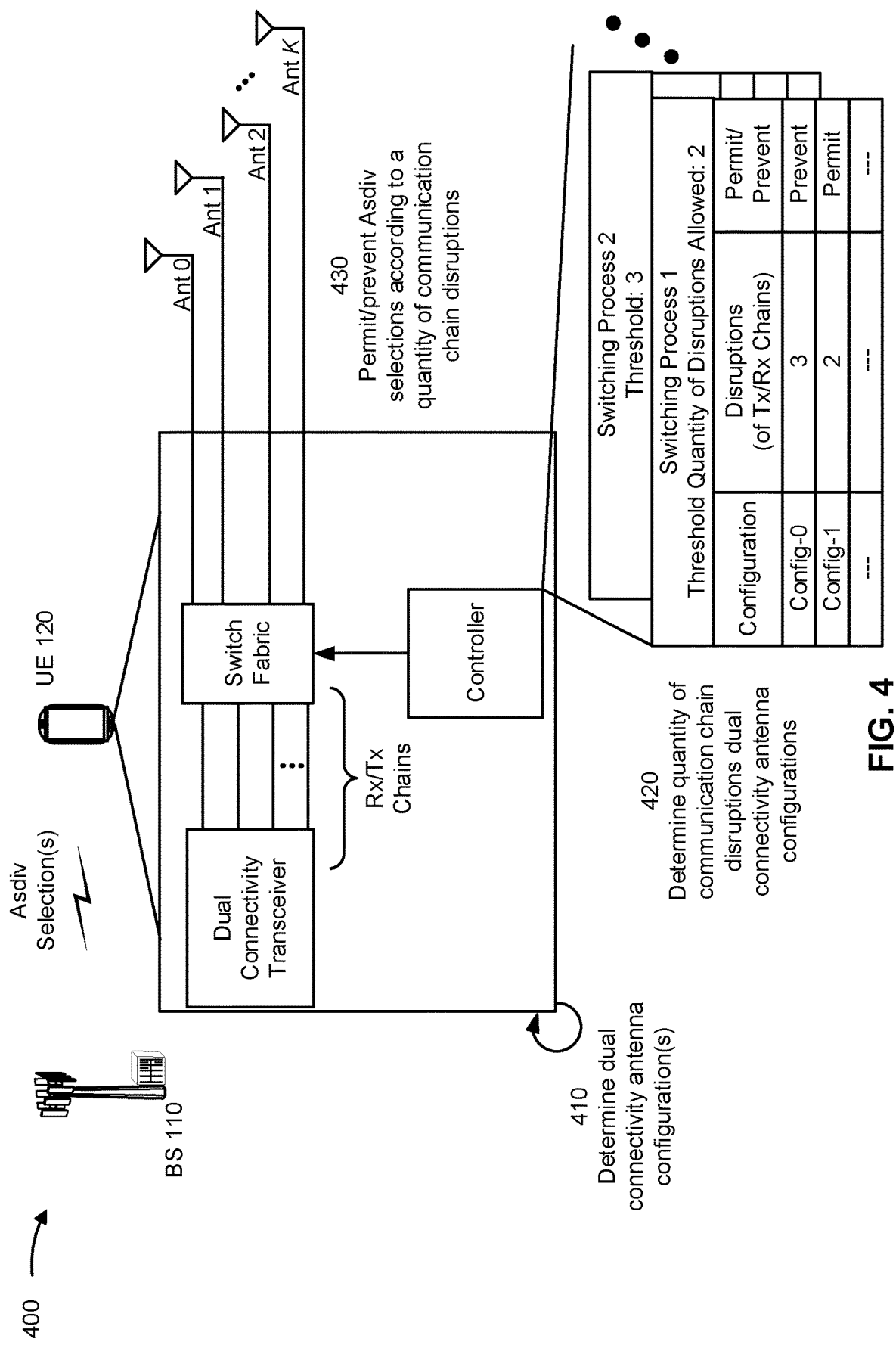
FIGS. 4-5 are diagrams illustrating examples associated with management of antenna switching according to a sounding reference symbol (SRS) antenna switching configuration, in accordance with the present disclosure.

FIG. 4 is a diagram illustrating an example 400 associated with management of antenna switching according to an SRS antenna switching configuration, in accordance with the present disclosure. As shown in FIG. 4, example 400 includes communication between a BS 110 and a UE 120.

UE 120, in example 400, includes a controller, a dual connectivity antenna configuration that includes one or more Tx chains of a dual connectivity transceiver, one or more Rx chains of the dual connectivity transceiver, a switch fabric, and a plurality of antennas (shown as Ant 0, Ant 1, and Ant 2 to Ant K). The dual connectivity transceiver may include a receive processor (e.g., receive processor 258) and/or a transmit processor (e.g., transmit processor 264). In some aspects, the switch fabric may include a plurality of cross-switches that are communicatively coupled (e.g., in a cascade configuration) to form the switch fabric. In some aspects, BS 110 and UE 120 may be included in a wireless network, such as wireless network 100. BS 110 and UE 120 may communicate via a wireless access link, which may include an uplink and a downlink.

As further shown in FIG. 4, and by reference number 410, UE 120 determines one or more dual connectivity antenna configurations for a dual connectivity antenna of UE 120. For example, the controller of UE 120 may determine a plurality of possible configurations of the dual connectivity antenna that are based on combinations of which Tx chains and Rx chains (referred to herein collectively as "communication chains") are communicatively coupled to which antennas of the dual connectivity antenna. Accordingly, UE 120 may iteratively simulate various combinations of Tx chains/Rx chains being transmitted and/or received through various combinations of the antennas to identify the plurality of possible configurations. In some implementations, the plurality of possible configurations may correspond to a plurality of possible Asdiv selections from BS 110 (and/or that may be determined by the controller).

As further shown in FIG. 4, and by reference number 420, UE 120 determines communication chain disruptions for switching processes according to the configurations. For example, as shown, for a first configuration (Config-0) and a first switching process (Switching Process 1), the controller may determine that 3 communication chains would be affected by the first switching process. In some implementations, UE 120 may determine disruptions of a particular type of communication chain (e.g., disruptions of specifically Rx chains and/or disruptions of specifically Tx chains). As another example, for a second configuration (Config-1) and the first switching process, the controller may determine that 2 communication chains would be disrupted, as described elsewhere herein.

A disruption of a communication chain may occur based on the switching process affecting a configuration of the communication chain. For example, a communication chain that is switched from one antenna to another antenna, as a result of a switching process, may experience a disruption. Additionally, or alternatively, a communication chain may experience a disruption (or may be affected) by the switching process if the switching process causes a first RAT and a second RAT to share a same antenna of the dual connectivity antenna. The first RAT may include an LTE technology and the second RAT may include an NR technology (e.g., under a ENDC mode). In some aspects, the first RAT and the second RAT may both be an NR technology (e.g., under a NRDC mode).

As further shown in FIG. 4, and by reference number 430, UE 120 permits or prevents one or more Asdiv selections according to corresponding quantities of the communication chain disruptions. For example, as described elsewhere herein, the Asdiv selection may correspond to one or more of the configurations of the dual connectivity antenna configuration. The one or more Asdiv selections may be received from BS 110 (e.g., in a request to reconfigure the dual connectivity antenna configuration) and/or received or requested from an operating system (or application) of UE 120.

UE 120 may determine whether to permit or prevent the Asdiv selection based on a comparison of a quantity of communication chains that are affected and a threshold quantity of allowable communication chain disruptions. The threshold quantity of allowable communication chain disruptions may correspond to a quantity of communication chain disruptions that are allowable to enable the dual connectivity antenna configuration to be adjusted according to a switching process. For example, as shown, the first switching process (e.g., an SRS antenna switching process or other type of NR switching process) may allow up to two communication chain disruptions and a second switching process may allow up to three communication chain disruptions (e.g., an LTE antenna switching process). Accordingly, in example 400, UE 120 may permit an Asdiv selection of the second configuration (Config-1) because the first switching process, when performed by UE 120, would cause a quantity of communication chain disruptions that satisfies the threshold quantity of allowable communication chain disruptions. UE 120 may prevent an Asdiv selection of the first configuration (Config-0) because, when UE 120 is required to perform the first switching process, a threshold quantity of allowable communication chain disruptions would be exceeded.

The threshold quantity of allowable communication chain disruptions may be a fixed threshold that may be set according to a default and/or a user setting. Additionally, or alternatively, the threshold may be dynamically adjusted based one or more parameters. For example, the threshold may correspond to and/or be based on a current downlink rank state of UE 120, a MIMO antenna capability of UE 120, and/or a configured dual connectivity mode of UE 120 (e.g., an ENDC mode, an NEDC mode, and/or an NRDC mode), among other examples. The downlink rank state may be determined from and/or identified within channel state information (CSI) that is received from BS 110. In some implementations, the threshold quantity of allowable communication chain disruptions may be relative to other quantities of disruptions caused by the switching process. For example, the threshold may correspond to an average of the determined quantities of disruptions for a dual connectivity antenna configuration and switching process combination. Additionally, or alternatively, UE 120 may determine that the threshold quantity of allowable communication chain disruptions for a configuration and switching process would be exceeded based on the switching process causing (or involving) the highest quantity of communication chain disruptions.

In some aspects, the threshold (e.g., as a fixed threshold) quantity of communication chain disruptions may set or define a maximum downlink rank state of UE 120. In such a case, UE 120 may determine the maximum downlink rank state based on the fixed threshold (e.g., as configured according to default setting, a user setting, and/or a setting that is defined by a switching process) by subtracting the total quantity of possible Rx chains from the threshold. Accordingly, if UE 120 is a 4-Rx communication chain capable on LTE and a fixed threshold of allowable communication chain disruptions is two, UE 120 may notify BS 110 that UE 120 has a current maximum downlink rank state of two (4 Rx chains–2 allowable disruptions=2 for a maximum downlink rank state).

As indicated above, FIG. 4 is provided as an example. Other examples may differ from what is described with respect to FIG. 4.

Figure 5:
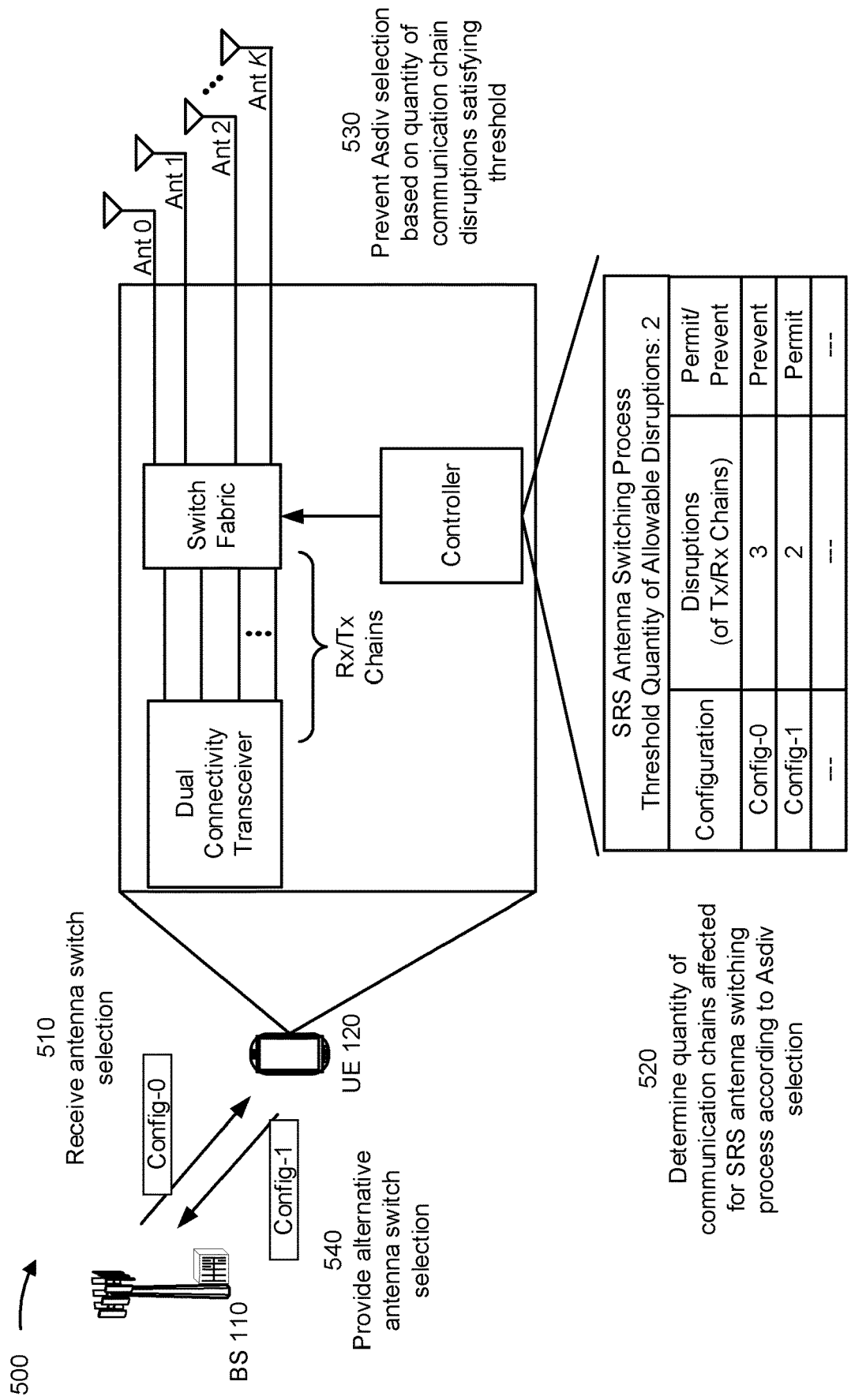

FIG. 5 is a diagram illustrating an example 500 associated with management of antenna switching according to an SRS antenna switching configuration, in accordance with the present disclosure. As shown in FIG. 5, example 500 includes communication between a BS 110 and a UE 120, and UE 120 may be similarly configured as described above in connection with example 400.

As shown in FIG. 5, and by reference number 510, UE 120 may receive a request for an LTE Asdiv selection. For example, the antenna switch selection may correspond to an LTE Asdiv selection that corresponds to a Config-0. As shown, the antenna switch selection may be received from BS 110, although UE 120 may initiate or obtain the antenna switch selection from an operating system or application of UE 120.

As further shown in FIG. 5, and by reference number 520, UE 120 determines a quantity of communication chains affected by an SRS antenna switching process. The SRS antenna switching process may be associated with an NR RAT, as described elsewhere herein.

As further shown in FIG. 5, and by reference number 530, UE 120 may prevent the Asdiv selection based on the quantity of communication chain disruptions satisfying the threshold quantity of allowable communication chain disruptions. For example, as similarly described above in connection with FIG. 4, UE 120 may prevent the antenna switch selection according to Config-0 because the threshold quantity of allowable disruptions (2) is exceeded by the quantity of communication chain disruptions (3) that would be caused by the SRS antenna switching process.

As further shown in FIG. 5, and by reference number 540, UE 120 may provide an alternative antenna switch selection to BS 110. For example, based on preventing the Asdiv selection of Config-0, UE 120 may indicate an Asdiv selection of a second configuration (Config-1) because, under the second configuration, the SRS switching process would cause a quantity of communication chain disruptions (2) that satisfies the threshold quantity of allowable communication chain disruptions (2). In some aspects, UE 120 may select an Asdiv selection (and/or corresponding configuration) that causes the least quantity of disruptions among a plurality of possible configurations of the dual connectivity antenna configuration.

In some implementations, UE 120 may report information to BS 110 based on a fixed threshold of allowable communication chain disruptions. For example, UE 120 may report a maximum downlink rank state. Additionally, or alternatively, UE 120 may report a MIMO capability (e.g., based on the quantity of antennas of the MIMO configuration, such as a DL 2×2 configuration, a DL 4×4 configuration, etc.) of the dual connectivity antenna configuration of the UE 120. More specifically, UE 120 may indicate (e.g., in RRC information) a quantity of spatial multiplexing layers in a downlink direction for one or more bandwidths (and/or bandwidth classes).

As indicated above, FIG. 5 is provided as an example. Other examples may differ from what is described with respect to FIG. 5.

Figure 6:
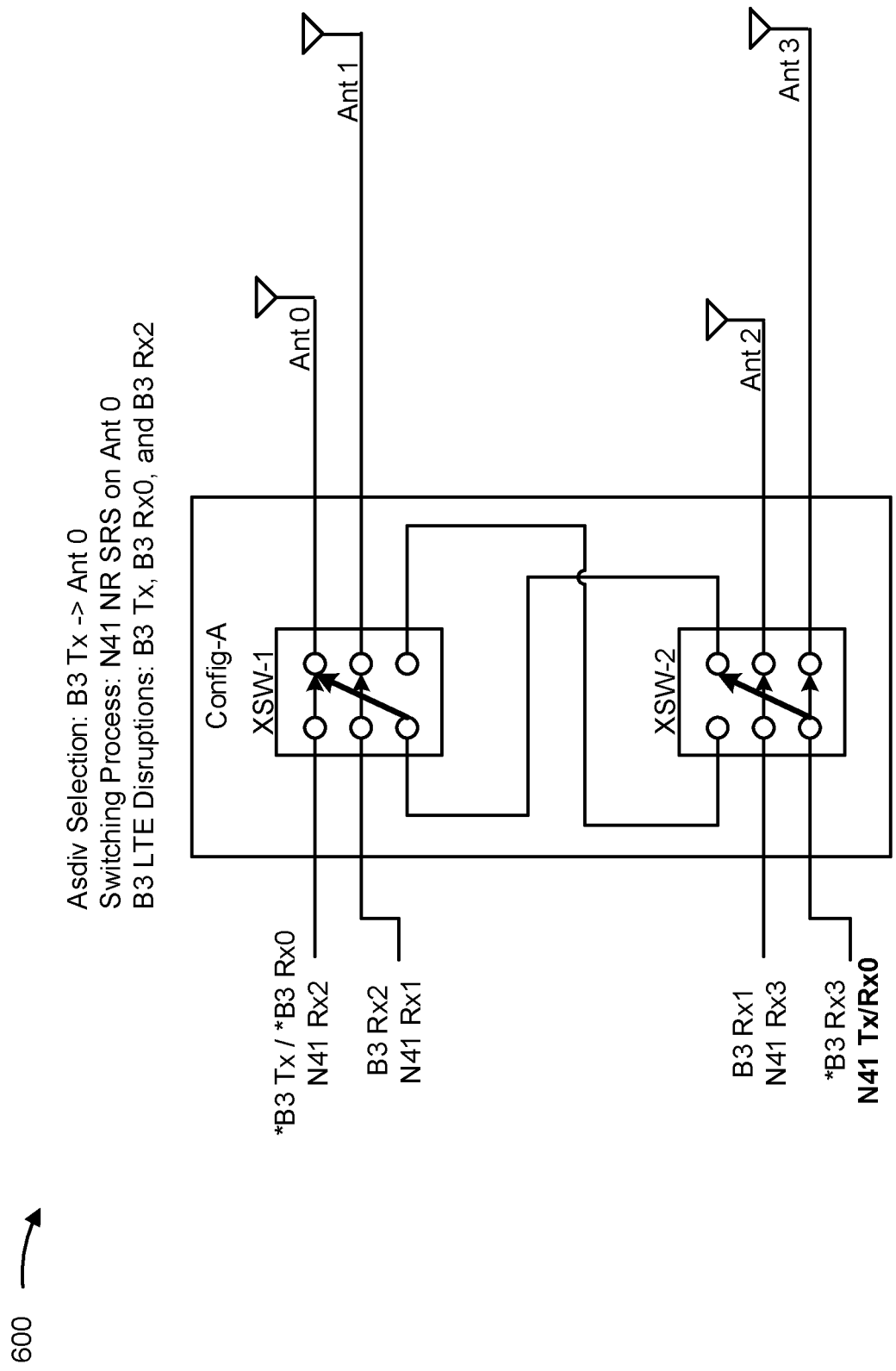
FIGS. 6-8 are diagrams illustrating example configurations of a dual connectivity antenna configuration, in accordance with the present disclosure.
Figure 7:
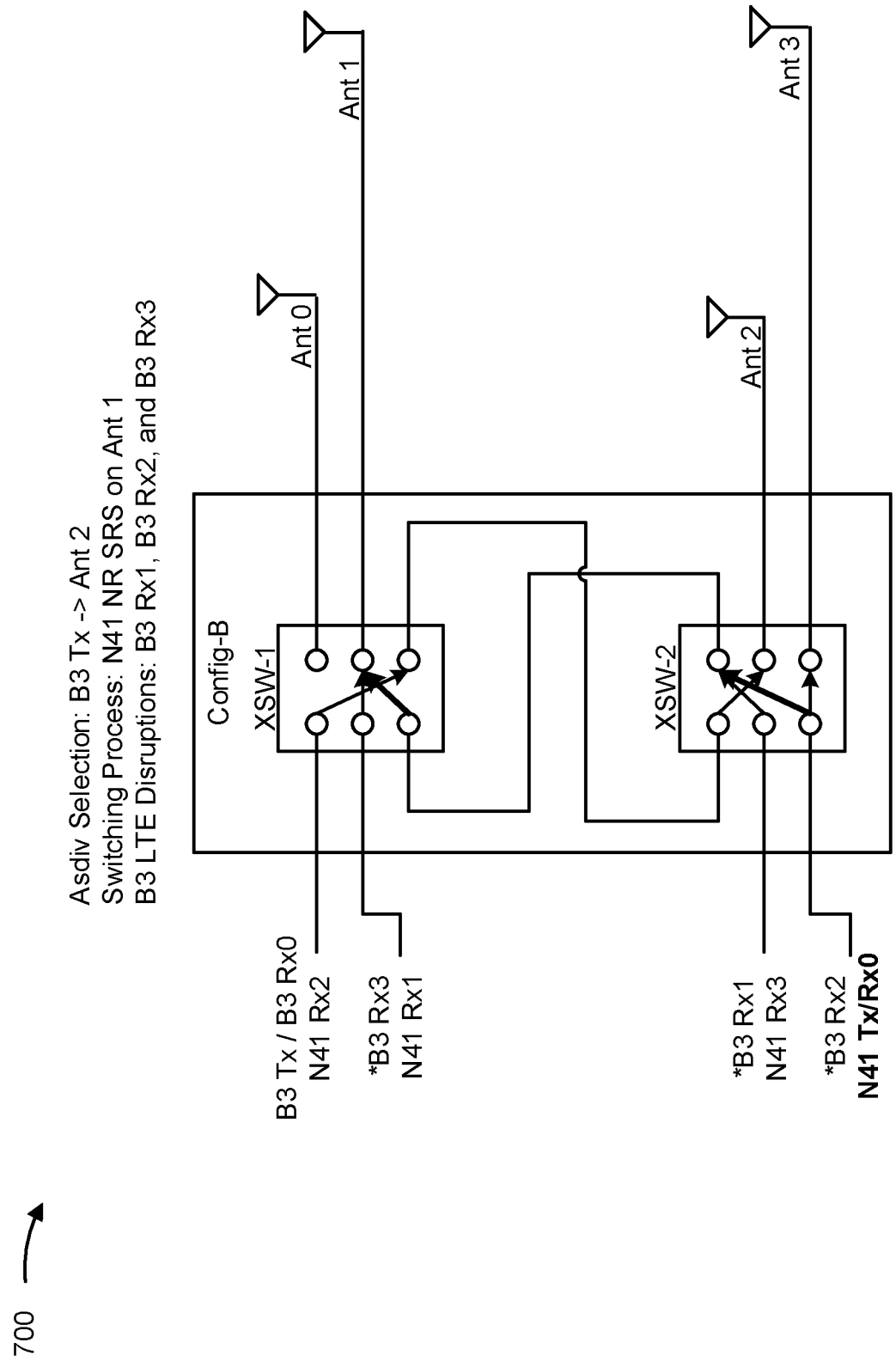
Figure 8:
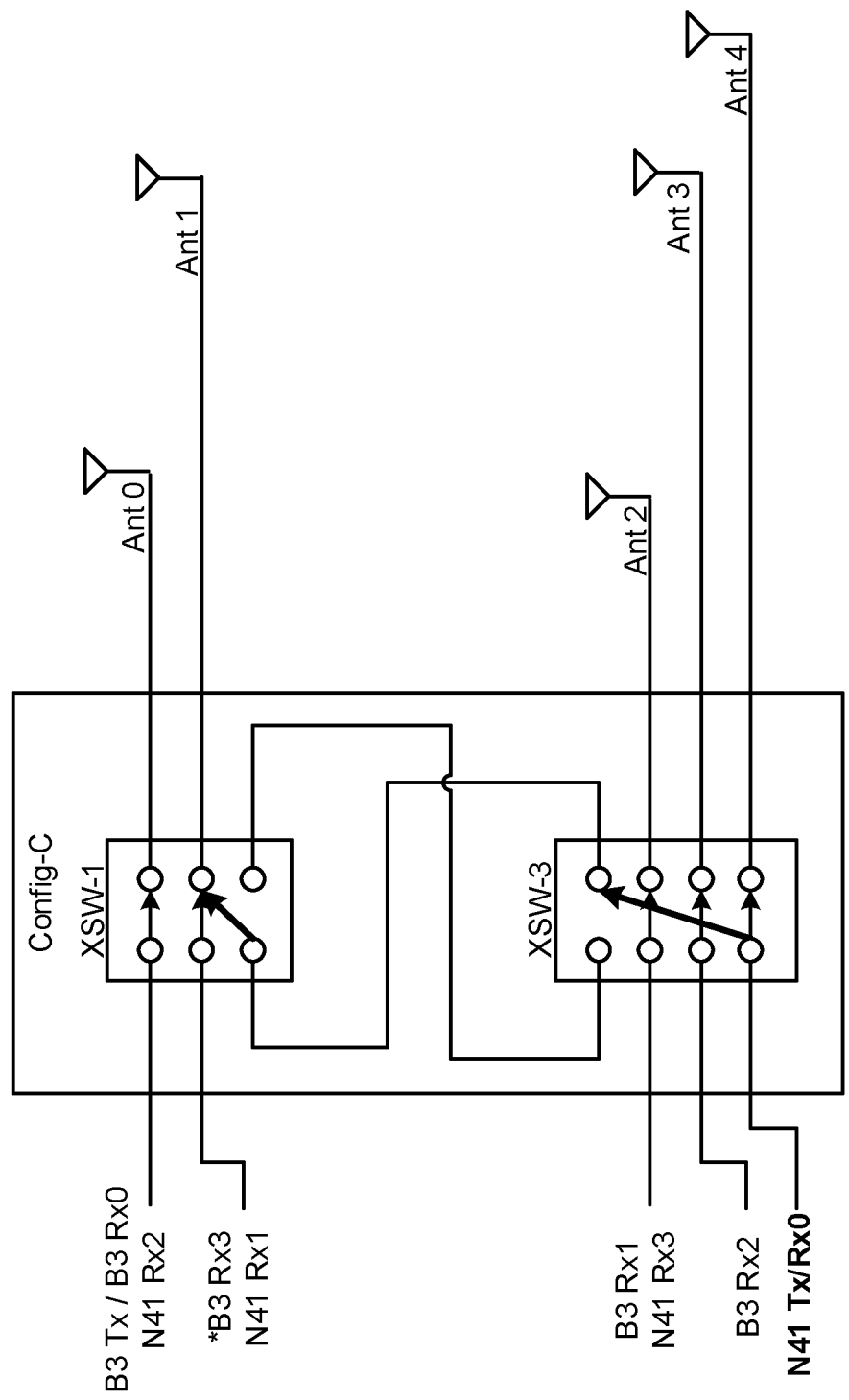

FIGS. 6-8 are diagrams illustrating example configurations of a dual connectivity antenna configuration, in accordance with the present disclosure. A UE (e.g., UE 120) that has the respective dual connectivity antenna configurations of FIGS. 6-8 may utilize an LTE band 3 (B3) (e.g., a frequency-division duplexing (FDD) band) and an NR band N41 (N41) (e.g., a time-division duplexing (TDD) band).

In example 600 of FIG. 6, a diagram of a dual connectivity antenna configuration (Config-A) that may be included within a UE (e.g., UE 120) is shown. Config-A includes four antennas (Ant 0, Ant 1, Ant 2, and Ant 3) and two cross-switches XSW-1 and XSW-2. The UE may determine that an Asdiv selection involving B3 Tx switching to Ant 0 (e.g., according to an LTE Asdiv Tx antenna selection) of Config-A would cause an NR SRS antenna switching process (involving N41 Tx via Ant 0) to affect the following LTE communication chains of Config-A: B3 Tx (because NR SRS would share a same antenna, Ant 0) and B3 Rx 0 (because Rx 0 shares a communication chain with B3 Tx).

According to the example of FIG. 6, if the threshold quantity of allowable LTE Rx chain disruptions is two or less, a controller (e.g., controller/processor 280) would allow a reconfiguration according to Config-A. However, if the threshold quantity of allowable LTE communication chain disruptions (including Tx and Rx) is two, the controller may deny the switch to Config-A (e.g., deny the LTE Asdiv Tx antenna selection) due to the impact of the NR SRS antenna switching process.

In example 700 of FIG. 7, a diagram of a dual connectivity antenna configuration (Config-B) that may be included within a UE (e.g., UE 120) is shown. Config-B includes four antennas (Ant 0, Ant 1, Ant 2, and Ant 3) and two cross-switches XSW-1 and XSW-2. The UE may determine that an Asdiv selection involving B3 Tx switching to Ant 1 (e.g., according to an LTE Asdiv Tx antenna selection) of Config-B would cause an NR SRS antenna switching process (involving N41 Tx via Ant 1) to affect the following LTE communication chains of Config-B: B3 Rx 1 (because NR SRS would share a same antenna, Ant 1), B3 Rx 2 (because B3 Rx 2 shares a communication chain with N41 Tx), and B3 Rx 3 (because NR SRS would share a same antenna, Ant 1).

According to the example of FIG. 7, if the threshold quantity of allowable LTE Rx chain disruptions is two or less, a controller (e.g., controller/processor 280) would prevent a reconfiguration according to Config-B. However, if the threshold quantity of allowable LTE communication chain disruptions (including Tx and Rx) is three or more, the controller may prevent the switch to Config-B (e.g., prevent the LTE Asdiv Tx antenna selection) due to the impact of the NR SRS antenna switching process.

In example 800 of FIG. 8, a diagram of a dual connectivity antenna configuration (Config-C) that may be included within a UE (e.g., UE 120) is shown. Config-C includes five antennas (Ant 0, Ant 1, Ant 2, Ant 3, and Ant 4) and two cross-switches XSW-1 and XSW-3 (which may include more switches than XSW-2 of the examples above). The UE may determine that an Asdiv selection involving B3 Tx switching to Ant 0 (e.g., according to an LTE Asdiv Tx antenna selection) of Config-C would cause an NR SRS antenna switching process (involving N41 Tx via Ant 1) to affect the following LTE communication chains of Config-C: B3 Tx (because NR SRS would share a same antenna, Ant 0) and B3 Rx 0 (because Rx 0 shares a communication chain with B3 Tx).

Accordingly, as shown in comparison to Config-A of example 600, the increased quantity of antennas and size of cross-switch XSW-3 (relative to the cross-switch XSW-2) in Config-C enables fewer disruptions to communication chains than Config-A. More specifically, Config-C enables an Asdiv selection that is similar to Config-A without causing a disruption to B3 Rx2, as caused using Config-A.

Figure 9:
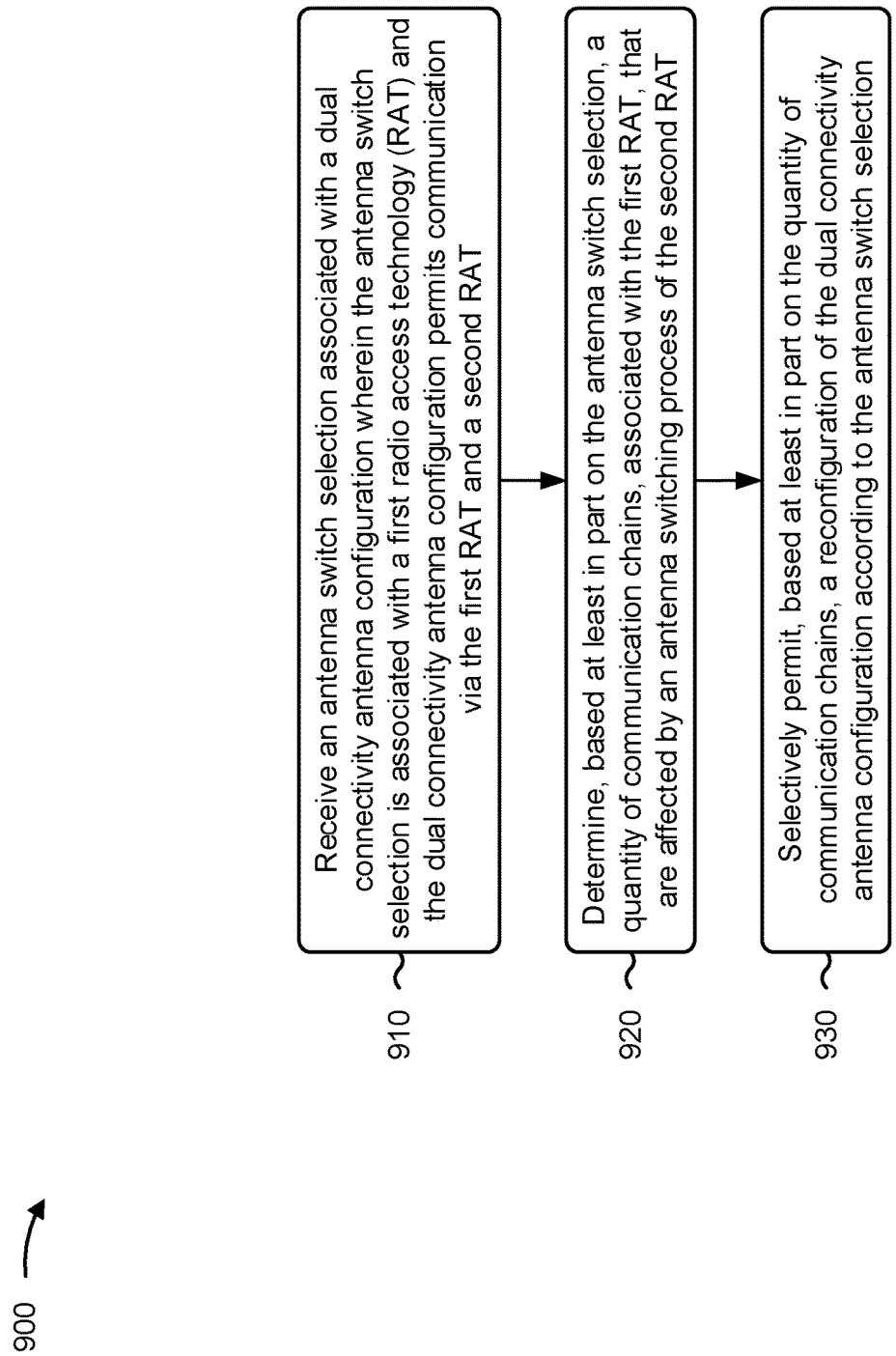
FIGS. 9-10 are diagrams illustrating example processes associated with management of antenna switching according to an SRS antenna switching configuration, in accordance with the present disclosure.

FIG. 9 is a diagram illustrating an example process 900 performed, for example, by a UE, in accordance with the present disclosure. Example process 900 is an example where the UE (e.g., UE 120) performs operations associated with management of antenna switching according to a sounding reference symbol antenna switching configuration.

As shown in FIG. 9, in some aspects, process 900 may include receiving an antenna switch selection associated with a dual connectivity antenna configuration, wherein the antenna switch selection is associated with a first radio access technology (RAT) and the dual connectivity antenna configuration permits communication via the first RAT and a second RAT (block 910). For example, the UE (e.g., using reception component 1102, depicted in FIG. 11) may receive an antenna switch selection associated with a dual connectivity antenna configuration, wherein the antenna switch selection is associated with a first RAT and the dual connectivity antenna configuration permits communication via the first RAT and a second RAT, as described above. In some aspects, the antenna switch selection is associated with a first RAT and the dual connectivity antenna configuration permits communication via the first RAT and a second RAT.

As further shown in FIG. 9, in some aspects, process 900 may include determining, based at least in part on the antenna switch selection, a quantity of communication chains, associated with the first RAT, that are affected by an antenna switching process of the second RAT (block 920). For example, the UE (e.g., using determination component 1108, depicted in FIG. 11) may determine, based at least in part on the antenna switch selection, a quantity of communication chains, associated with the first RAT, that are affected by an antenna switching process of the second RAT, as described above.

As further shown in FIG. 9, in some aspects, process 900 may include selectively permitting, based at least in part on the quantity of communication chains, a reconfiguration of the dual connectivity antenna configuration according to the antenna switch selection (block 930). For example, the UE (e.g., using selection component 1110, depicted in FIG. 11) may selectively permit, based at least in part on the quantity of communication chains, a reconfiguration of the dual connectivity antenna configuration according to the antenna switch selection, as described above.

Process 900 may include additional aspects, such as any single aspect or any combination of aspects described below and/or in connection with one or more other processes described elsewhere herein.

In a first aspect, the antenna switch selection is associated with an antenna switched diversity selection process of the first RAT.

In a second aspect, alone or in combination with the first aspect, the antenna switching process comprises an SRS antenna switching process.

In a third aspect, alone or in combination with one or more of the first and second aspects, a communication chain, of the quantity of communication chains, comprises at least one of a receive chain of the first RAT, or a transmit chain of the first RAT.

In a fourth aspect, alone or in combination with one or more of the first through third aspects, a communication chain, of the quantity of communication chains, is affected by the antenna switching process based at least in part on the antenna switching process causing the communication chain to be switched to a different antenna.

In a fifth aspect, alone or in combination with one or more of the first through fourth aspects, a communication chain, of the quantity of communication chains, is affected by the antenna switching process based at least in part on the antenna switching process causing the first RAT and the second RAT to share a same antenna of the dual connectivity antenna configuration.

In a sixth aspect, alone or in combination with one or more of the first through fifth aspects, the dual connectivity antenna configuration comprises a plurality of antennas, and one or more cross-switches to adjust the dual connectivity antenna configuration.

In a seventh aspect, alone or in combination with one or more of the first through sixth aspects, selectively permitting the antenna switch selection comprises determining that the quantity of communication chains does not satisfy a threshold associated with enabling the dual connectivity antenna configuration to be adjusted according to the antenna switch selection, determining an alternative antenna switch selection that satisfies the threshold, and enabling the alternative antenna switch selection to be selected to adjust the dual connectivity antenna configuration.

In an eighth aspect, alone or in combination with one or more of the first through seventh aspects, selectively permitting the antenna switch selection comprises selectively permitting the reconfiguration based at least in part on whether the quantity of the communication chains satisfies a threshold associated with enabling the dual connectivity antenna configuration to be adjusted according to the antenna switch selection, wherein the antenna switch selection is to be blocked when the quantity of the communication chains does not satisfy the threshold, or wherein the antenna switch selection is to be performed when the quantity of the communication chains satisfies the threshold.

In a ninth aspect, alone or in combination with one or more of the first through eighth aspects, the threshold is a fixed threshold.

In a tenth aspect, alone or in combination with one or more of the first through ninth aspects, the fixed threshold is used to determine a maximum downlink rank that is reported to a network associated with the first RAT.

In an eleventh aspect, alone or in combination with one or more of the first through tenth aspects, the fixed threshold is associated with a multiple-input multiple-output antenna capability that is reported to a network associated with the first RAT.

In a twelfth aspect, alone or in combination with one or more of the first through eleventh aspects, the threshold is a dynamic threshold that is based at least in part on a metric associated with the first RAT.

In a thirteenth aspect, alone or in combination with one or more of the first through twelfth aspects, the metric comprises at least one of a current downlink rank state, a filtered downlink rank state during a time period, or a maximum rank state during a time period.

In a fourteenth aspect, alone or in combination with one or more of the first through thirteenth aspects, the first RAT comprises a Long-Term Evolution (LTE) technology and the second RAT comprises a New Radio (NR) technology.

In a fifteenth aspect, alone or in combination with one or more of the first through fourteenth aspects, the first RAT and the second RAT are associated with a New Radio (NR) technology.

In a sixteenth aspect, alone or in combination with one or more of the first through fifteenth aspects, the second RAT uses time-division duplexing (TDD) for wireless communication and the first RAT uses at least one of TDD for wireless communication, or frequency-division duplexing (FDD) for wireless communication.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
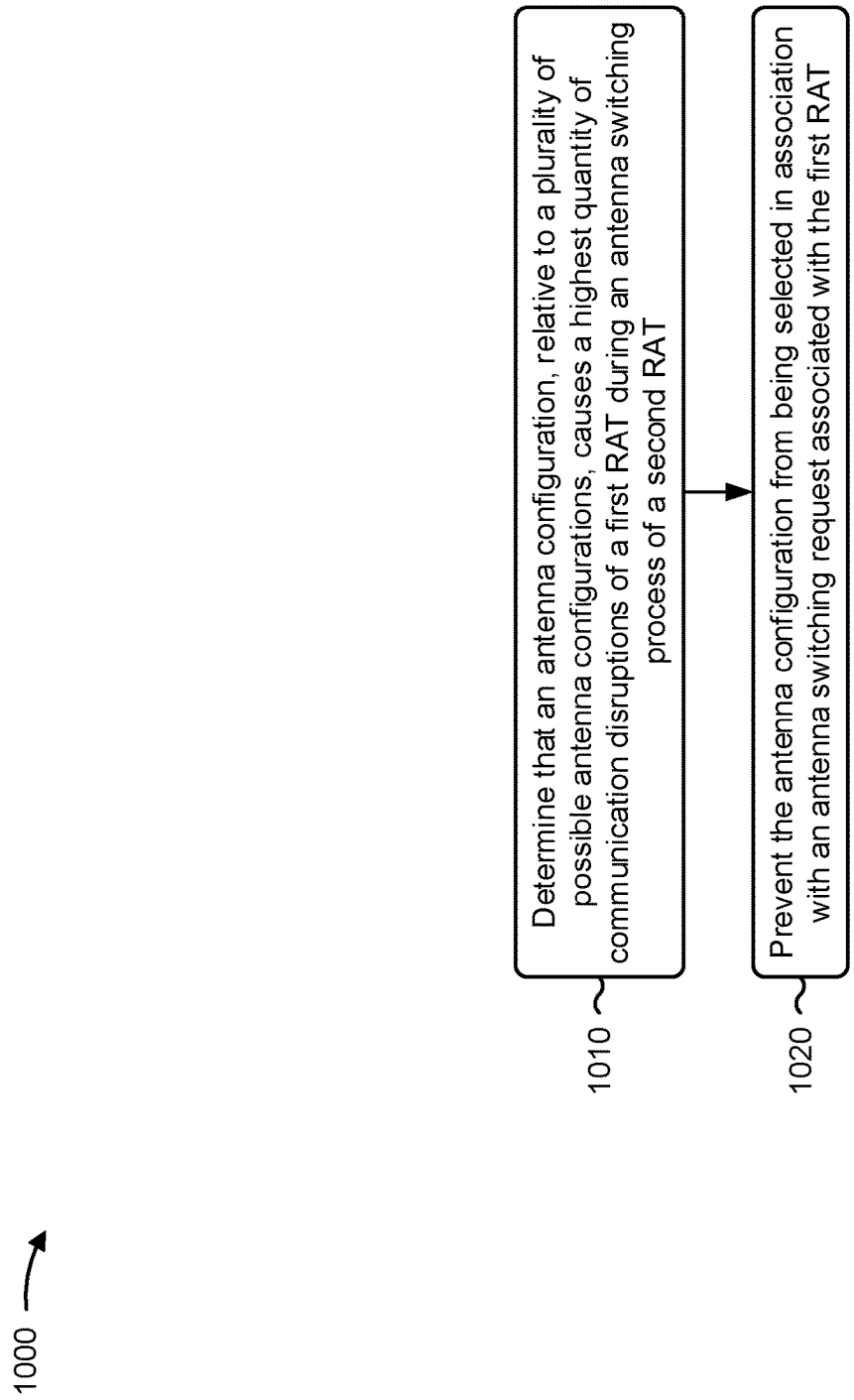

FIG. 10 is a diagram illustrating an example process 1000 performed, for example, by a UE, in accordance with the present disclosure. Example process 1000 is an example where the UE (e.g., UE 120) performs operations associated with management of antenna switching according to a sounding reference symbol antenna switching configuration.

As shown in FIG. 10, in some aspects, process 1000 may include determining that an antenna configuration, relative to a plurality of possible antenna configurations, causes a highest quantity of communication disruptions of a first RAT during an antenna switching process of a second RAT (block 1010). For example, the UE (e.g., using determination component 1108, depicted in FIG. 11) may determine that an antenna configuration, relative to a plurality of possible antenna configurations, causes a highest quantity of communication disruptions of a first RAT during an antenna switching process of a second RAT, as described above.

As further shown in FIG. 10, in some aspects, process 1000 may include preventing the antenna configuration from being selected in association with an antenna switching request associated with the first RAT (block 1020). For example, the UE (e.g., using selection component 1110, depicted in FIG. 11) may prevent the antenna configuration from being selected in association with an antenna switching request associated with the first RAT, as described above.

Process 1000 may include additional aspects, such as any single aspect or any combination of aspects described below and/or in connection with one or more other processes described elsewhere herein.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
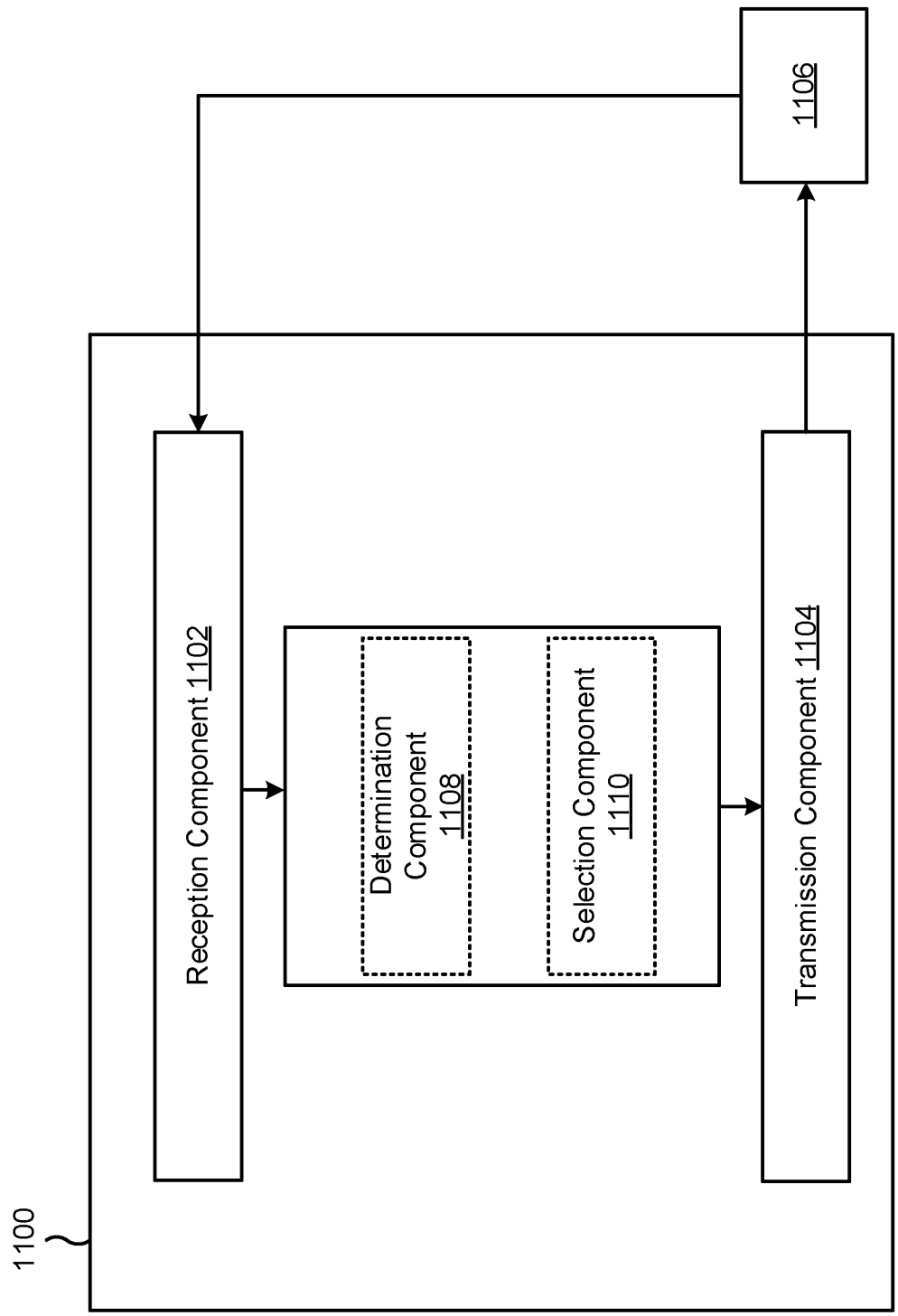
FIG. 11 is a block diagram of an example apparatus for wireless communication, in accordance with the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include one or more of a determination component 1108 and/or a selection component 1110, among other examples.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9, process 1000 of FIG. 10, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive an antenna switch selection associated with a dual connectivity antenna configuration, wherein the antenna switch selection is associated with a first RAT and the dual connectivity antenna configuration permits communication via the first RAT and a second RAT. The determination component 1108 may determine, based at least in part on the antenna switch selection, a quantity of communication chains, associated with the first RAT, that are affected by an antenna switching process of the second RAT. The selection component 1110 may selectively permit, based at least in part on the quantity of communication chains, a reconfiguration of the dual connectivity antenna configuration according to the antenna switch selection.

The determination component 1108 may determine that an antenna configuration, relative to a plurality of possible antenna configurations, causes a highest quantity of communication disruptions of a first RAT during an antenna switching process of a second RAT. The selection component 1110 may prevent the antenna configuration from being selected in association with an antenna switching request associated with the first RAT.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving an antenna switch selection associated with a dual connectivity antenna configuration, wherein the antenna switch selection is associated with a first radio access technology (RAT) and the dual connectivity antenna configuration permits communication via the first RAT and a second RAT; determining, based at least in part on the antenna switch selection, a quantity of communication chains, associated with the first RAT, that are affected by an antenna switching process of the second RAT; and selectively permitting, based at least in part on the quantity of communication chains, a reconfiguration of the dual connectivity antenna configuration according to the antenna switch selection.

Aspect 2: The method of Aspect 1, wherein the antenna switch selection is associated with an antenna switched diversity selection process of the first RAT.

Aspect 3: The method of any of Aspects 1-2, wherein the antenna switching process comprises a sounding reference symbol (SRS) antenna switching process.

Aspect 4: The method of any of Aspects 1-3, wherein a communication chain, of the quantity of communication chains, comprises at least one of: a receive chain of the first RAT, or a transmit chain of the first RAT.

Aspect 5: The method of any of Aspects 1-4, wherein a communication chain, of the quantity of communication chains, is affected by the antenna switching process based at least in part on the antenna switching process causing the communication chain to be switched to a different antenna.

Aspect 6: The method of any of Aspects 1-5, wherein a communication chain, of the quantity of communication chains, is affected by the antenna switching process based at least in part on the antenna switching process causing the first RAT and the second RAT to share a same antenna of the dual connectivity antenna configuration.

Aspect 7: The method of any of Aspects 1-6, wherein the dual connectivity antenna configuration comprises: a plurality of antennas, and one or more cross-switches to adjust the dual connectivity antenna configuration.

Aspect 8: The method of any of Aspects 1-7, wherein selectively permitting the antenna switch selection comprises: determining that the quantity of communication chains does not satisfy a threshold associated with enabling the dual connectivity antenna configuration to be adjusted according to the antenna switch selection; determining an alternative antenna switch selection that satisfies the threshold; and enabling the alternative antenna switch selection to be selected to adjust the dual connectivity antenna configuration.

Aspect 9: The method of any of Aspects 1-8, wherein selectively permitting the antenna switch selection comprises: selectively permitting the reconfiguration based at least in part on whether the quantity of the communication chains satisfies a threshold associated with enabling the dual connectivity antenna configuration to be adjusted according to the antenna switch selection, wherein the antenna switch selection is to be blocked when the quantity of the communication chains does not satisfy the threshold, or wherein the antenna switch selection is to be performed when the quantity of the communication chains satisfies the threshold.

Aspect 10: The method of Aspect 9, wherein the threshold is a fixed threshold.

Aspect 11: The method of Aspect 10, wherein the fixed threshold is used to determine a maximum downlink rank that is reported to a network associated with the first RAT.

Aspect 12: The method of any of Aspects 9-11, wherein the fixed threshold is associated with a multiple-input multiple-output antenna capability that is reported to a network associated with the first RAT.

Aspect 13: The method of any of Aspects 9-12, wherein the threshold is a dynamic threshold that is based at least in part on a metric associated with the first RAT.

Aspect 14: The method of Aspect 13, wherein the metric comprises at least one of: a current downlink rank state, a filtered downlink rank state during a time period, or a maximum rank state during a time period.

Aspect 15: The method of any of Aspects 1-14, wherein the first RAT comprises a Long-Term Evolution (LTE) technology and the second RAT comprises a New Radio (NR) technology.

Aspect 16: The method of any of Aspects 1-14, wherein the first RAT and the second RAT are associated with a New Radio (NR) technology.

Aspect 17: The method of any of Aspects 1-16, wherein the second RAT uses time-division duplexing (TDD) for wireless communication and the first RAT uses at least one of: TDD for wireless communication, or frequency-division duplexing (FDD) for wireless communication.

Aspect 18: A method of wireless communication performed by a user equipment (UE), comprising: determining that an antenna configuration, relative to a plurality of possible antenna configurations, causes a highest quantity of communication disruptions of a first radio access technology (RAT) during an antenna switching process of a second RAT; and preventing the antenna configuration from being selected in association with an antenna switching request associated with the first RAT.

Aspect 19: An apparatus for wireless communication at a device, comprising a processor; memory coupled with the processor; and instructions stored in the memory and executable by the processor to cause the apparatus to perform the method of one or more Aspects of Aspects 1-18.

Aspect 20: A device for wireless communication, comprising a memory and one or more processors coupled to the memory, the memory and the one or more processors configured to perform the method of one or more Aspects of Aspects 1-18.

Aspect 21: An apparatus for wireless communication, comprising at least one means for performing the method of one or more Aspects of Aspects 1-18.

Aspect 22: A non-transitory computer-readable medium storing code for wireless communication, the code comprising instructions executable by a processor to perform the method of one or more Aspects of Aspects 1-18.

Aspect 23: A non-transitory computer-readable medium storing a set of instructions for wireless communication, the set of instructions comprising one or more instructions that, when executed by one or more processors of a device, cause the device to perform the method of one or more Aspects of Aspects 1-18.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving an antenna switch selection associated with a dual connectivity antenna configuration,
      wherein the antenna switch selection is associated with a first radio access technology (RAT) and the dual connectivity antenna configuration permits communication via the first RAT and a second RAT;
   determining, based at least in part on the antenna switch selection, a quantity of communication chains, associated with the first RAT, that are affected by a sounding reference symbol (SRS) antenna switching process of the second RAT, wherein the second RAT uses time-division duplexing (TDD) for wireless communication and the first RAT uses at least one of TDD or frequency-division duplexing (FDD) for wireless communication; and
   selectively permitting, based at least in part on the quantity of communication chains affected by the SRS antenna switching process, a reconfiguration of the dual connectivity antenna configuration according to the antenna switch selection.

2. The method of claim 1, wherein the antenna switch selection is associated with an antenna switched diversity selection process of the first RAT.

3. The method of claim 1, wherein a communication chain, of the quantity of communication chains, comprises at least one of:
   a receive chain of the first RAT, or
   a transmit chain of the first RAT.

4. The method of claim 1, wherein a communication chain, of the quantity of communication chains, is affected by the SRS antenna switching process based at least in part on the SRS antenna switching process causing the communication chain to be switched to a different antenna.

5. The method of claim 1, wherein a communication chain, of the quantity of communication chains, is affected by the SRS antenna switching process based at least in part on the SRS antenna switching process causing the first RAT and the second RAT to share a same antenna of the dual connectivity antenna configuration.

6. The method of claim 1, wherein the dual connectivity antenna configuration comprises:
   a plurality of antennas, and
   one or more cross-switches to adjust the dual connectivity antenna configuration.

7. The method of claim 1, wherein selectively permitting the antenna switch selection comprises:
   determining that the quantity of communication chains does not satisfy a threshold associated with enabling the dual connectivity antenna configuration to be adjusted according to the antenna switch selection;
   determining an alternative antenna switch selection that satisfies the threshold; and
   enabling the alternative antenna switch selection to be selected to adjust the dual connectivity antenna configuration.

8. The method of claim 1, wherein selectively permitting the antenna switch selection comprises:
   selectively permitting the reconfiguration based at least in part on whether the quantity of the communication chains satisfies a threshold associated with enabling the dual connectivity antenna configuration to be adjusted according to the antenna switch selection,
   wherein the antenna switch selection is to be blocked when the quantity of the communication chains does not satisfy the threshold, or
   wherein the antenna switch selection is to be performed when the quantity of the communication chains satisfies the threshold.

9. The method of claim 8, wherein the threshold is a fixed threshold.

10. The method of claim 9, wherein the fixed threshold is used to determine a maximum downlink rank that is reported to a network associated with the first RAT.

11. The method of claim 9, wherein the fixed threshold is associated with a multiple-input multiple-output antenna capability that is reported to a network associated with the first RAT.

12. The method of claim 8, wherein the threshold is a dynamic threshold that is based at least in part on a metric associated with the first RAT.

13. The method of claim 12, wherein the metric comprises at least one of:
   a current downlink rank state,
   a filtered downlink rank state during a time period, or
   a maximum rank state during a time period.

14. The method of claim 1, wherein the first RAT comprises a Long-Term Evolution (LTE) technology and the second RAT comprises a New Radio (NR) technology.

15. The method of claim 1, wherein the first RAT and the second RAT are associated with a New Radio (NR) technology.

16. A user equipment (UE), comprising:
   one or more memories; and
   one or more processors, communicatively coupled to the one or more memories, configured to:
      receive an antenna switch selection associated with a dual connectivity antenna configuration,
         wherein the antenna switch selection is associated with a first radio access technology (RAT) and the dual connectivity antenna configuration permits communication via the first RAT and a second RAT, wherein the second RAT uses time-division duplexing (TDD) for wireless communication and the first RAT uses at least one of TDD or frequency-division duplexing (FDD) for wireless communication;
      determine, based at least in part on the antenna switch selection, a quantity of communication chains, associated with the first RAT, that are affected by a sounding reference symbol (SRS) antenna switching process of the second RAT; and
      selectively permit, based at least in part on the quantity of communication chains affected by the SRS antenna switching process, a reconfiguration of the dual connectivity antenna configuration according to the antenna switch selection.

17. The UE of claim 16, wherein a communication chain, of the quantity of communication chains, is affected by the SRS antenna switching process based at least in part on the SRS antenna switching process causing the communication chain to be switched to a different antenna.

18. The UE of claim 16, wherein a communication chain, of the quantity of communication chains, is affected by the SRS antenna switching process based at least in part on the SRS antenna switching process causing the first RAT and the second RAT to share a same antenna of the dual connectivity antenna configuration.

19. The UE of claim 16, wherein the one or more processors, when selectively permitting the antenna switch selection, are configured to:
   determine that the quantity of communication chains does not satisfy a threshold associated with enabling the dual connectivity antenna configuration to be adjusted according to the antenna switch selection;
   determine an alternative antenna switch selection that satisfies the threshold; and
   enable the alternative antenna switch selection to be selected to adjust the dual connectivity antenna configuration.

20. The UE of claim 16, wherein the one or more processors, when selectively permitting the antenna switch selection, are configured to:
   selectively permit the reconfiguration based at least in part on whether the quantity of the communication chains satisfies a threshold associated with enabling the dual connectivity antenna configuration to be adjusted according to the antenna switch selection,
   wherein the antenna switch selection is to be blocked when the quantity of the communication chains does not satisfy the threshold, or
   wherein the antenna switch selection is to be performed when the quantity of the communication chains satisfies the threshold.

21. A non-transitory computer-readable medium storing a set of instructions, the set of instructions comprising:
   one or more instructions that, when executed by one or more processors of a user equipment (UE), cause the UE to:
      receive an antenna switch selection associated with a dual connectivity antenna configuration,
         wherein the antenna switch selection is associated with a first radio access technology (RAT) and the dual connectivity antenna configuration permits communication via the first RAT and a second RAT, wherein the second RAT uses time-division duplexing (TDD) for wireless communication and the first RAT uses at least one of TDD or frequency-division duplexing (FDD) for wireless communication;

determine, based at least in part on the antenna switch selection, a quantity of communication chains, associated with the first RAT, that are affected by a sounding reference symbol (SRS) antenna switching process of the second RAT; and selectively permit, based at least in part on the quantity of communication chains affected by the SRS antenna switching process, a reconfiguration of the dual connectivity antenna configuration according to the antenna switch selection.

22. The non-transitory computer-readable medium of claim 21, wherein a communication chain, of the quantity of communication chains, is affected by the SRS antenna switching process based at least in part on the SRS antenna switching process causing the communication chain to be switched to a different antenna.

23. The non-transitory computer-readable medium of claim 21, wherein a communication chain, of the quantity of communication chains, is affected by the SRS antenna switching process based at least in part on the SRS antenna switching process causing the first RAT and the second RAT to share a same antenna of the dual connectivity antenna configuration.

24. The non-transitory computer-readable medium of claim 21, wherein the one or more instructions, that cause the UE to selectively permit the antenna switch selection, cause the UE to:

determine that the quantity of communication chains does not satisfy a threshold associated with enabling the dual connectivity antenna configuration to be adjusted according to the antenna switch selection;

determine an alternative antenna switch selection that satisfies the threshold; and enable the alternative antenna switch selection to be selected to adjust the dual connectivity antenna configuration.

25. The non-transitory computer-readable medium of claim 21, wherein the one or more instructions, that cause the UE to selectively permit the antenna switch selection, cause the UE to:

selectively permit the reconfiguration based at least in part on whether the quantity of the communication chains satisfies a threshold associated with enabling the dual connectivity antenna configuration to be adjusted according to the antenna switch selection, wherein the antenna switch selection is to be blocked when the quantity of the communication chains does not satisfy the threshold, or wherein the antenna switch selection is to be performed when the quantity of the communication chains satisfies the threshold.

26. An apparatus, comprising:

means for receiving an antenna switch selection associated with a dual connectivity antenna configuration, wherein the antenna switch selection is associated with a first radio access technology (RAT) and the dual connectivity antenna configuration permits communication via the first RAT and a second RAT, wherein the second RAT uses time-division duplexing (TDD) for wireless communication and the first RAT uses at least one of TDD or frequency-division duplexing (FDD) for wireless communication;

means for determining, based at least in part on the antenna switch selection, a quantity of communication chains, associated with the first RAT, that are affected by a sounding reference symbol (SRS) antenna switching process of the second RAT; and means for selectively permitting, based at least in part on the quantity of communication chains affected by the SRS antenna switching process, a reconfiguration of the dual connectivity antenna configuration according to the antenna switch selection.

27. The apparatus of claim 26, wherein the means for selectively permitting the antenna switch selection comprises:

means for determining that the quantity of communication chains does not satisfy a threshold associated with enabling the dual connectivity antenna configuration to be adjusted according to the antenna switch selection;

means for determining an alternative antenna switch selection that satisfies the threshold; and means for enabling the alternative antenna switch selection to be selected to adjust the dual connectivity antenna configuration.

28. The apparatus of claim 26, wherein the means for selectively permitting the antenna switch selection comprises:

means for selectively permitting the reconfiguration based at least in part on whether the quantity of the communication chains satisfies a threshold associated with enabling the dual connectivity antenna configuration to be adjusted according to the antenna switch selection, wherein the antenna switch selection is to be blocked when the quantity of the communication chains does not satisfy the threshold, or wherein the antenna switch selection is to be performed when the quantity of the communication chains satisfies the threshold.

* * * * *